G. MARCONI.
APPARATUS FOR WIRELESS TELEGRAPHY.
APPLICATION FILED APR. 10, 1908.
935,383.
Patented Sept. 28, 1909.
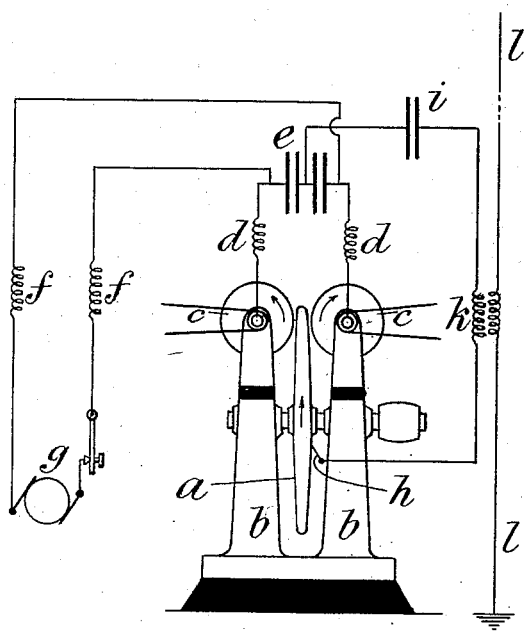

UNITED STATES PATENT OFFICE.

GUGLIELMO MARCONI, OF ADELPHI, LONDON, ENGLAND, ASSIGNOR TO MARCONI WIRELESS TELEGRAPH COMPANY OF AMERICA, OF NEW YORK, N. Y., A CORPORATION OF NEW JERSEY.

APPARATUS FOR WIRELESS TELEGRAPHY.

935,383.  Specification of Letters Patent.  Patented Sept. 28, 1909.

Application filed April 10, 1908. Serial No. 426,185.

*To all whom it may concern:*

Be it known that I, GUGLIELMO MARCONI, LL. D., D. Sc., a subject of the King of Italy, residing at Watergate House, Adelphi, London, England, have invented new and useful Improvements in Apparatus for Wireless Telegraphy, of which the following is a specification.

This invention relates to appliances for creating continuous or closely adjacent trains of electric oscillations, either undamped or very slightly damped, and applying these to create the corresponding electric waves required for wireless telegraphy.

The apparatus comprises a metal disk, which may be called the middle disk, and which is insulated from the earth and can be rotated at a very high speed by means of an electric motor, steam turbine, or engine of any type either directly connected to it or coupled by a belt or other gearing. Adjacent to the disk are placed two other insulated conducting disks, which may be called the polar disks, and which can also be rotated at a high speed by any convenient means, so that the adjacent parts of the moving disks are traveling in opposite directions. These polar disks should have their peripheries very close to the surfaces or edges of the middle disk. The polar disks, stationary balls, or similar devices which may be used in their stead are placed so as very nearly to touch the surfaces of the middle disk. If necessary the balls may be cooled by water circulation or otherwise. The two polar disks are connected respectively to the outer ends of two condensers joined in series and hereinafter called the reservoir condenser by means of conductors in which may be inserted resistances or inductances, and these condensers are also connected through inductive resistances of suitable value to the terminals of a source of electric supply which may be either a continuous current dynamo, a secondary battery, an induction coil or transformer, or an alternator of sufficiently high voltage to discharge across the two small air gaps which separate the middle disk from the polar disks, on either side. If the generator has a sufficiently low internal resistance the reservoir condenser may be dispensed with. At some convenient place on the middle disk a metallic or rubbing contact is provided, and between this contact and the middle point of the reservoir condenser or the middle point of the source of electromotive force if this condenser be not used, is inserted an oscillation circuit consisting of a condenser in series with an inductance, which last is connected inductively or conductively to a suitable antenna and to the earth or to a balancing capacity.

Under some circumstances when generators of high electromotive force are used a series of disks may be employed with their peripheries closely adjacent all rotating at a high speed but so that adjacent portions of neighboring disks move in opposite directions. In this case the middle disk of the series is connected through a rubbing contact with one end of the oscillating circuit, and the two outside disks with the reservoir condenser or source of electric supply, the other arrangements remaining the same as above described. In any case, to obtain the best results the electric time period of the antenna must be syntonized with that of the oscillating circuit comprising the condenser and inductance connected between the middle wheel and the center point of the reservoir condenser or the generator.

The drawing is a diagrammatic representation of a transmitter in accordance with this invention.

$a$ is the middle disk capable of being rotated at a very high speed by means of a belt pulley or in other convenient way and carried on insulated supports $b$ $b$. It is found that a peripheral speed of 300 feet or more per second works well and the disk should of course be so made as to stand such speeds.

$c$ $c$ are the polar disks connected through resistances or inductances $d$ $d$ to the outer plates of the reservoir condenser $e$ which plates are also connected through inductive resistances $f$ to a source of electric supply or generator $g$. In circuit with the middle or neutral point of the reservoir condenser or a neutral point in the generator circuit and with a brush or contact $h$ on the disk $a$ are a condenser $i$ and inductance $k$ connected either conductively or inductively as shown to an aerial conductor or antenna $l$ which is as usual connected to earth or to a capacity. It is preferable to have the inductance and resistance of the circuit last named small as compared with those of either arm of the circuit containing the reservoir condenser and the polar disks.

The condenser $i$ may in some cases be omitted provided the reservoir condenser is retained.

The polar disks may be placed at such an angle with respect to the middle disk that their peripheries shall travel in opposite directions to adjacent points on the middle disk.

What I claim is:—

1. In a transmitting apparatus for wireless telegraphy, a rotatable body having a smooth peripheral surface, means for rotating said body at a high speed, terminals located adjacent said body and forming spark gaps therewith, a source of electric energy connected with said terminals, a condenser connected in parallel with said terminals, and an oscillatory circuit connected with said rotatable body and with the middle or neutral point of said condenser.

2. In a transmitting apparatus for wireless telegraphy, a source of constant electromotive force, a rotatable disk, means for rotating said disk at a high speed, a pair of metallic terminal disks connected respectively with the terminals of said source of current and located on opposite sides of the first named disk, a condenser connected in parallel with said terminal disks, and an oscillatory circuit connected with the intermediate disk and with the middle or neutral point of said condenser.

GUGLIELMO MARCONI.

Witnesses:
HENRY W. ALLEN,
G. F. WARREN.